(12) United States Patent
Suzuki (10) Patent No.: US 11,609,725 B2
(45) Date of Patent: Mar. 21, 2023

(54) TERMINAL DEVICE THAT DISPLAYS PROGRESS OF A PROCESS IN CHAT STYLE

(71) Applicant: Seiko Epson Corporation, Tokyo (JP)

(72) Inventor: Atsushi Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/405,182

(22) Filed: Aug. 18, 2021

(65) Prior Publication Data

US 2022/0057971 A1   Feb. 24, 2022

(30) Foreign Application Priority Data

Aug. 21, 2020  (JP) .............................. JP2020-140468

(51) Int. Cl.
*G06F 15/00* (2006.01)
*G06F 3/12* (2006.01)
*G06K 1/00* (2006.01)

(52) U.S. Cl.
CPC .......... *G06F 3/1207* (2013.01); *G06F 3/1236* (2013.01); *G06F 3/1259* (2013.01); *G06F 3/1288* (2013.01)

(58) Field of Classification Search
CPC .... G06F 3/1207; G06F 3/1236; G06F 3/1259; G06F 3/1288
USPC ................................ 358/1.15, 1.14, 1.13, 1.1
See application file for complete search history.

(56) References Cited

U.S. PATENT DOCUMENTS

| 2002/0062299 A1* | 5/2002 | Matsukura .............. G06F 16/93 |
| 2016/0381111 A1* | 12/2016 | Barnett .............. H04N 5/23206 |
| | | 709/231 |
| 2021/0165616 A1* | 6/2021 | Yasuda ................. G06F 3/1204 |

FOREIGN PATENT DOCUMENTS

JP          2019-205116          11/2019

* cited by examiner

*Primary Examiner* — Douglas Q Tran
(74) *Attorney, Agent, or Firm* — Workman Nydegger (57) ABSTRACT

Disclosed is a screen display method for providing display, on a display screen included in a terminal device, for a given process to be performed for an image processing apparatus. The screen display method includes displaying, in a chat style, a plurality of instructions regarding the given process and a plurality of responses to the instructions, and providing progress display indicating a progress of the given process.

20 Claims, 7 Drawing Sheets

TERMINAL DEVICE THAT DISPLAYS PROGRESS OF A PROCESS IN CHAT STYLE

The present application is based on, and claims priority from JP Application Serial Number 2020-140468, filed Aug. 21, 2020, the disclosure of which is hereby incorporated by reference herein in its entirety.

BACKGROUND

1. Technical Field

The present disclosure relates to a screen display method, a storage medium, and a terminal device.

2. Related Art

A user interface that displays a chat-style screen as display of the display screen of a smartphone to allow the user to perform printing, multi-function printer registration, multi-function printer search, and the like has been presented (for example, see JP-A-2019-205116).

When information is displayed in a chat style as described in JP-A-2019-205116, it becomes difficult to understand the entire scope of the displayed information as the amount of displayed information increases. Therefore, there is a problem in that it is difficult to recognize how far the process performed by the user has proceeded.

SUMMARY

An aspect of the present disclosure is a screen display method for providing, on a display screen included in a terminal device, display for a given process to be performed for an image processing apparatus. The screen display method includes displaying, in a chat style, a plurality of instructions regarding the given process and a plurality of responses to the instructions, and providing progress display indicating a progress of the given process.

Another aspect of the present disclosure is a non-transitory computer-readable storage medium storing a program that, when executed by a processor of a terminal device that includes a display screen and provides display for a given process to be performed for an image processing apparatus, causes the processor to perform a method. The method includes, on the display screen, displaying, in a chat style, a plurality of instructions regarding the given process and a plurality of responses to the instructions, and providing, on the display screen, progress display indicating a progress of the given process.

Still another aspect of the present disclosure is a terminal device that provides display for a given process to be performed for an image processing apparatus. The terminal device includes a display section configured to provide display; a display controller configured to cause the display section to display a user interface image that displays, in a chat style, a plurality of instructions or requests to a user regarding the given process to be performed for the image processing apparatus and a plurality of responses to the instructions, and to provide progress display indicating a progress of the given process; an input section configured to receive input of the responses to the requests; and a process execution section configured to cause the given process to be executed for the image processing apparatus.

DESCRIPTION OF EXEMPLARY EMBODIMENTS

1. Configuration of Printing System 100

Embodiments of the present disclosure will be described below with reference to the accompanying drawings.

Figure 1:
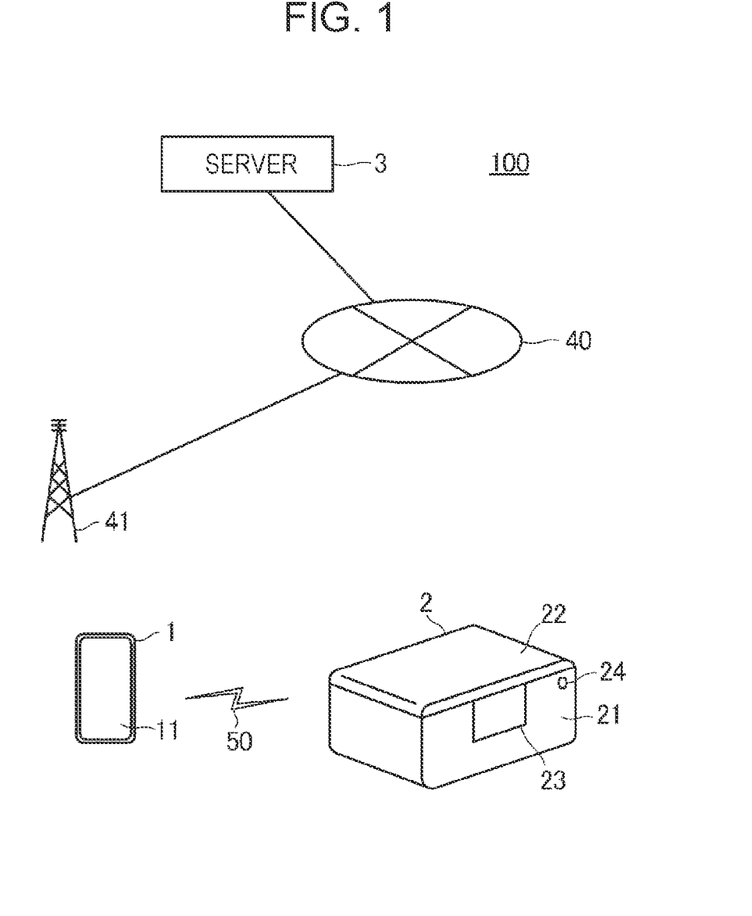
FIG. 1 is a diagram illustrating a schematic configuration of a printing system.

FIG. 1 is a diagram illustrating a schematic configuration of a printing system 100.

As illustrated in FIG. 1, the printing system 100 includes a terminal device 1 and a printer 2.

The printer 2 corresponds to an example of the image processing apparatus and the printing system 100 corresponds to an example of the image processing system.

The terminal device 1 is communicably connected to a server 3 via a communication network 40. The communication network 40 is composed, for example, of leased lines, a public network, and a mobile radio communication network and includes a local area network (LAN), and may be either a wide area network (WAN) or a local network. The communication network 40 may include various devices, such as a line switching device and a server. The connection of each of the terminal device 1 and the server 3 with the communication network 40 may be wireless or wired. In the configuration example illustrated in FIG. 1, the communication network 40 includes a base station 41 that constitutes the mobile radio communication network. The terminal device 1 is connected to the server 3 by performing wireless communication with the base station 41.

The terminal device 1 is a device that the user uses. The terminal device 1 is a mobile portable terminal, such as a laptop computer, a tablet computer, or a smartphone. The numbers of the terminal devices 1 and the printers 2 included in the printing system 100 are not limited, and a plurality of terminal devices 1 and a plurality of printers 2 may be used.

The terminal device 1 is connected to the printer 2 over a communication channel 50, which enables communication of data between the terminal device 1 and the printer 2. The communication channel 50 may be a wired data communication line or may be a wireless data communication line.

The terminal device 1 includes a touch panel 11. The touch panel 11 is a unit in which a display panel and a touch sensor are superposed on each other. Examples of the display panel of the touch panel 11 include a liquid crystal display panel and an organic electroluminescent (EL) panel. The touch sensor is a sensor capable of sensing a contact operation of the user and locates the operating position. The touch sensor may be a capacitive sensor, may be a pressure-sensitive sensor, or may employ another sensing method. The touch panel 11 functions as a display device, which displays characters and images in the terminal device 1, and as an operating device, which detects an operation of the user for the terminal device 1. The touch panel 11 corresponds to an example of a display surface.

The terminal device 1 provides, to the user, a user interface 6 for guiding the operations of the printer 2. The user interface 6 is an initial setup user interface with which the user performs initial setup to use the printer 2. The user interface 6 is a chat-style interface that displays messages including characters and images in a conversational style on the touch panel 11.

The printer 2 is a printing device that prints an image on a printing medium. No restriction is imposed on the type of the printing medium, and examples of the printing medium include cut sheets of a certain size, roll paper, and sheets of synthetic resin. No restriction is imposed on the printing method of the printer 2, and printing methods of a dot impact type, a thermal sublimation type, a thermal type, and the like may be employed. In the present embodiment, the case where the printer 2 is an ink jet printing apparatus is described. The printer 2 includes an ink tank and a print head that discharges ink in a printer main body 21, and forms an image by discharging ink onto a printing surface of a printing medium.

The printer main body 21 of the printer 2 is provided with an openable and closable cover 22. The cover 22 is opened during an operation of replenishing an ink tank with ink. The printer main body 21 is provided with a display panel 23 that displays an operating state and the like of the printer 2. The display panel 23 may be a touch panel that detects a touch operation of the user. The printer main body 21 is provided with a power supply switch 24 for turning on or off the power supply of the printer 2.

Figure 2:
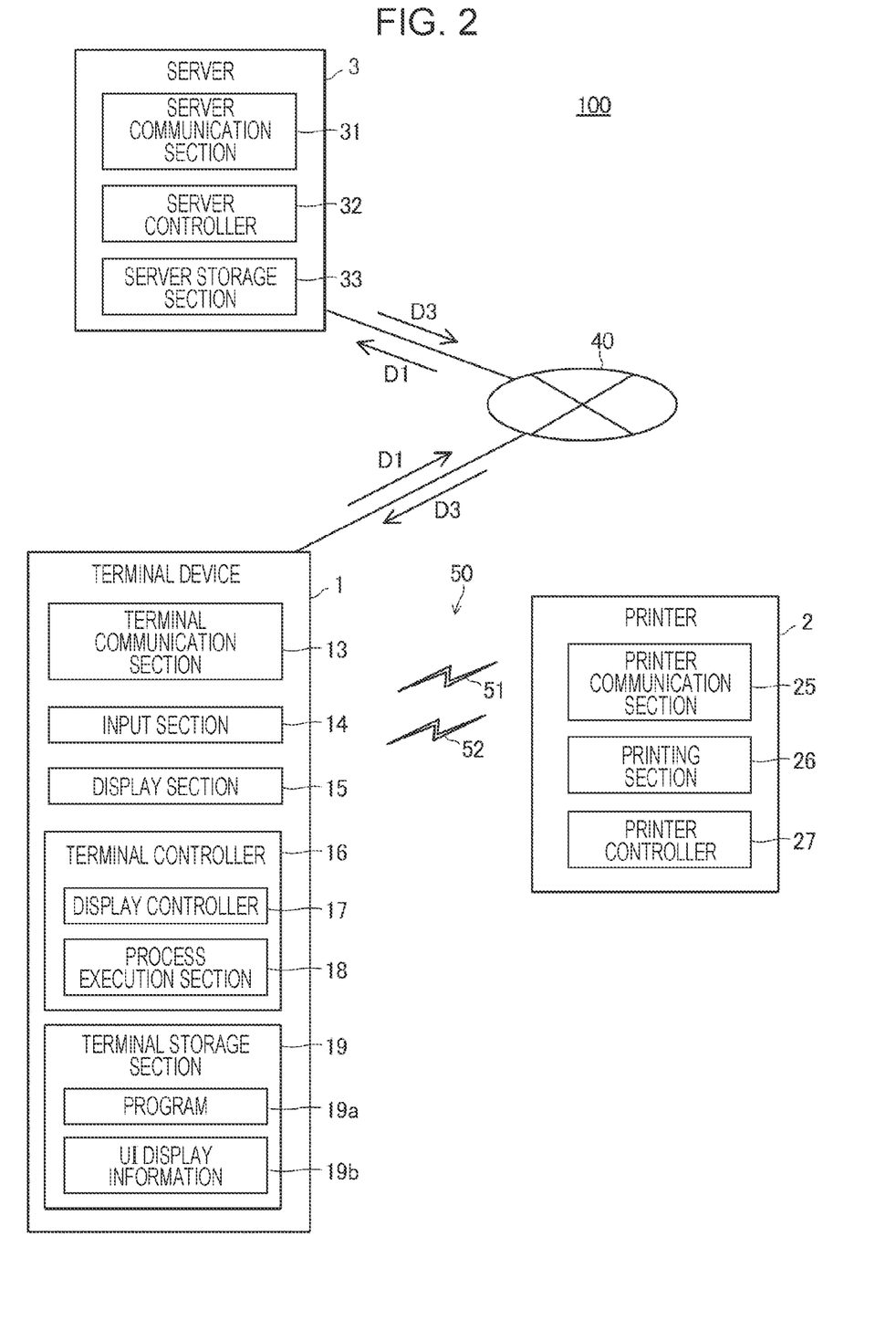
FIG. 2 is a functional block diagram of devices included in the printing system.

FIG. 2 is a functional block diagram of devices included in the printing system 100.

The terminal device 1 includes a terminal communication section 13, an input section 14, a display section 15, a terminal controller 16, and a terminal storage section 19.

The terminal communication section 13 is a communication interface that performs data communication. The terminal communication section 13, which includes a communication module that includes an antenna, a baseband circuit, a radio frequency (RF) circuit, a modem, and the like, is a wireless communication interface that performs communication with the base station 41.

The terminal communication section 13 has a function of performing data communication with the printer 2 over the communication channel 50. The communication channel 50 includes a first communication channel 51 and a second communication channel 52 consisting of wireless communication lines. The first communication channel 51 and the second communication channel 52 are each a wireless data communication line of Wi-Fi, Bluetooth, near field communication (NFC), or the like. The communication channel 50 includes the first communication channel 51 and the second communication channel 52 using different methods of communication, and uses a Bluetooth communication line for the first communication channel 51 and uses a Wi-Fi communication line via an access point for the second communication channel 52. The terminal communication section 13 includes a wireless communication module that performs Bluetooth communication, and a wireless communication module that performs Wi-Fi communication. Wi-Fi and Bluetooth are registered trademarks.

The input section 14 receives user input by acquiring a detected value of a touch sensor of the touch panel 11. By using an operating position or an operation trajectory detected by the touch panel 11, the input section 14 determines the type of the user operation. The operating position refers to a touch position at which a finger or the like of the user touches the touch panel 11. Examples of the operation type include tapping and swiping. Tapping is an operation in which a finger of the user or the like is touching the touch panel 11 for a short time during which the touch position moves very little. Tapping may also be referred to as touching. Swiping is an operation of moving the touch position with a finger or the like of the user touching the touch panel 11.

The display section 15 is the touch panel 11 that displays images and characters in accordance with operations of the terminal device 1 under the control of the terminal controller 16.

The terminal controller 16 is a processor, such as a central processing unit (CPU) or a microprocessor. The terminal controller 16 runs the program 19a stored in the terminal storage section 19, controlling components of the terminal device 1. The terminal controller 16 may include a random-access memory (RAM) constituting a work area of the processor or may include other peripheral circuitry.

The terminal storage section 19 is a nonvolatile memory made of a magnetic storage device, an optical storage medium, a semiconductor memory device, or the like. The terminal storage section 19 stores the program 19a for execution by the processor of the terminal controller 16 and UI display information 19b for displaying the user interface 6 described later. The terminal storage section 19 corresponds to an example of a storage section. The terminal storage section 19 may be a read-only memory (ROM) that is integrated into the terminal controller 16.

The program 19a is a control program that controls the terminal device 1. The program 19a includes an operating system that implements the basic functions of the terminal device 1. The operating system provides the communication functions performed by the terminal communication section 13 and the functions of the input section 14. The terminal controller 16 runs an operating system, providing a platform for executing application programs of the terminal device 1.

The terminal storage section 19 stores the UI display information 19b. The UI display information 19b is information indicating the content of the user interface 6 displayed by a display controller 17. This information includes the content of logs 61 displayed in the user interface 6 described later and information specifying the display order.

The terminal controller 16 includes the display controller 17 and a process execution section 18. The display controller 17 and the process execution section 18 are configured when the terminal controller 16 executes the program 19a. The display controller 17 corresponds to a display control function through which the operating system controls the display section 15. The process execution section 18 executes application programs with the operating system.

The terminal controller 16 controls the terminal communication section 13 to cause data communication with the printer 2 and data communication with the server 3 to be performed.

The process execution section 18 executes an application program having a function of guiding the user through the procedure of initial setup of the printer 2 and a function of performing setting for the printer 2.

The process execution section 18 executes the application program mentioned above to implement the following functions. The process execution section 18 performs communication with the printer 2 by using the terminal communication section 13 to acquire information that identifies the model of the printer 2 and the manufacturer of the printer 2. The process execution section 18 derives printer information D1 from the information acquired from the printer 2 and transmits the printer information D1 to the server 3. In accordance with the printer information D1, the server 3 transmits UI information D3 for providing the user interface 6 that supports the printer 2, to the terminal device 1. Hereinbelow, UI is the abbreviation for the user interface.

The process execution section 18 receives the UI information D3 from the server 3 and generates the UI display information 19b based on the UI information D3 to cause the UI display information 19b to be stored in the terminal storage section 19.

In accordance with the UI display information 19b, the display controller 17 causes the user interface 6 to be displayed on the touch panel 11 by the display section 15. The user interface 6 corresponds to an example of the user interface image.

When the input section 14 receives an operation on the touch panel 11 during display of the user interface 6, the process execution section 18 acquires information input by the user. In accordance with the user input, the display controller 17 changes display of the user interface 6. The process execution section 18 acquires information about setting of the printer 2 in accordance with the operation detected by the input section 14, and performs setting for the printer 2 in accordance with the acquired information.

The process execution section 18 executes an application program that provides an instruction for printing to the printer 2 whose initial setup is complete. The process execution section 18 generates print data including data on characters and images to be printed on a printing medium, control data to specify printing conditions, a command that provides an instruction for printing, and the like and transmits the generated print data to the printer 2 using the function of the terminal communication section 13.

The printer 2 includes a printer communication section 25, a printing section 26, and a printer controller 27. The printer communication section 25 is a communication interface that performs data communication with the terminal device 1. In FIG. 2, the printer communication section 25 is a wireless communication interface including communication modules including an antenna, a baseband circuit, an RF circuit, a modem, and the like. The printer communication section 25 performs wireless communication over the first communication channel 51 and wireless communication over the second communication channel 52

The printing section 26 is a printing mechanism that prints an image on a printing medium. The printing section 26 includes a print head that discharges ink, and a transport mechanism that transports a printing medium. The printing section 26 may have a configuration including various types of sensors that detect the positions and sizes of printing media, a head scanning mechanism that scans the print head, and so on.

The printer controller 27 controls the printer communication section 25 to perform data communication with the terminal device 1. When receiving data about setting of the printer 2 from the terminal device 1, the printer controller 27 sets the printer 2 according to the received data.

When receiving print data from the terminal device 1, the printer controller 27 controls the printing section 26 according to the received print data, causing the printing section 26 to perform printing on a printing medium.

The server 3 includes a server communication section 31, a server controller 32, and a server storage section 33.

The server communication section 31 is a communication interface that performs data communication via the communication network 40.

The server controller 32 is a processor, such as a CPU or a microcomputer, and controls each section of the server 3 when the processor executes a control program. The server controller 32 may include a ROM storing, in a nonvolatile manner, a server control program for execution by the processor and/or a RAM constituting a work area for the processor or may include other peripheral circuitry.

The server controller 32 controls the server communication section 31 to perform data communication with the terminal device 1. When receiving the printer information D1 transmitted from the terminal device 1, the server controller 32 identifies the model and manufacturer of the printer 2 by using the printer information D1. The server controller 32 generates the UI information D3 provided for the printer 2 or reads out the UI information D3, and transmits the UI information D3 to the terminal device 1. The UI information D3 includes, as described later, data on display objects, such as characters and images, displayed by the terminal device 1, data specifying the display order and display positions of the display objects, and so on. The server 3 stores, in the server storage section 33, the UI information D3 provided for the functions and specifications of the printer 2 or data for generating the UI information D3.

The server storage section 33, which is a non-volatile memory made of a magnetic storage device, an optical storage medium, a semiconductor memory device, or the like, stores programs for execution by the processor of the server controller 32 and various types of data.

2. Operations of Printing System 100

Figure 3:
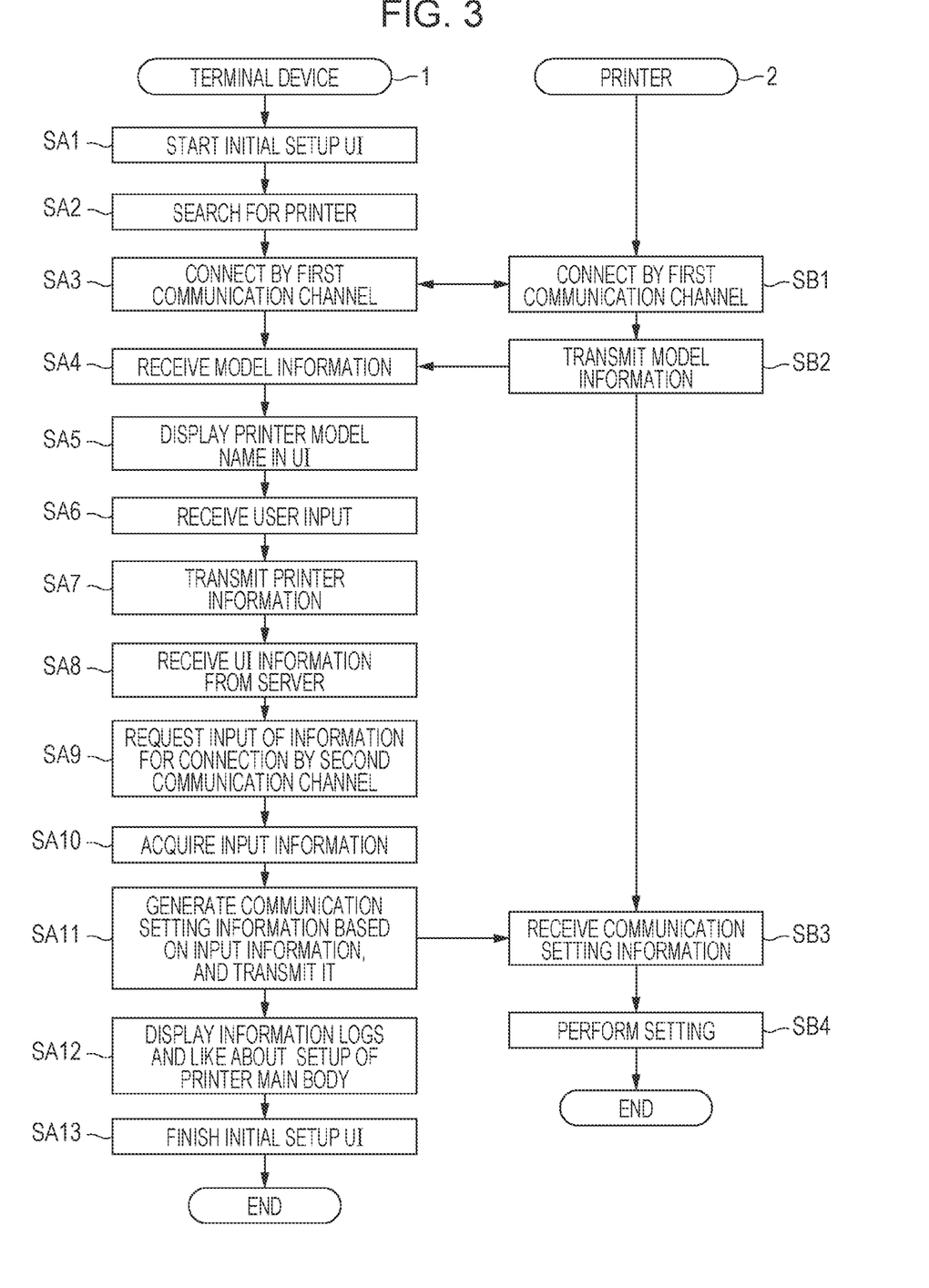
FIG. 3 is a sequence diagram illustrating operations of the printing system.

FIG. 3 is a sequence diagram illustrating some of the operations during initial setup of the printing system 100, illustrating operations of the terminal device 1 and operations of the printer 2. The operations illustrated in FIG. 3 are executed by the terminal controller 16 of the terminal device 1 and the printer controller 27 of the printer 2.

In the printing system 100, the terminal device 1 displays a user interface 6 to allow the user to perform initial setup of the printer 2. FIG. 3 illustrates operations during the initial setup using the user interface 6. The user interface 6 may be referred to as a user interface image.

The terminal device 1 starts the user interface 6 to display a user interface screen on the touch panel 11 (step SA1). The terminal device 1 searches for the printer 2 with which communication of Bluetooth, which is used as the first communication channel by the terminal communication section 13, may be performed (step SA2). If the terminal device 1 discovers the printer 2 as a result of searching in step SA2, the terminal communication section 13 and the printer communication section 25 of the printer 2 communicate with each other and the terminal device 1 is connected with the printer 2 over the first communication channel 51 (steps SA3, SB1).

The printer 2 transmits model information in response to a request of the terminal device 1 (step SB2), and the terminal device 1 receives the model information from the printer 2 (step SA4). The model information includes at least one of the model of the printer 2, the manufacturer of the printer 2, and information identifying the specifications and the like of the printer 2. Prior to the operation of step SB2, the terminal device 1 may request the printer 2 to transmit the model information.

The terminal device 1 displays the model information received from the printer 2 by using the user interface 6 (step SA5) and receives user input via the touch panel 11 (step SA6). At this point, in accordance with the model information displayed on the touch panel 11, the user performs input of approving that a device for which initial setup is to be performed is the printer 2 having the model information displayed on the touch panel 11. Additionally, in step SA6, the user may perform input indicating that the initial setup is to be performed for a different device. In this case, the terminal device 1 may perform search again in step SA2.

The terminal device 1 generates the printer information D1 based on information acquired from the printer 2 and transmits the printer information D1 to the server 3 (step SA7). As described above, the server 3 transmits the UI information D3 provided for the printer information D1. The terminal device 1 receives the UI information D3 transmitted from the server 3 (step SA8).

The user interface 6 is a user interface for initial setup of the printer 2. The user interface 6 includes an instruction information log regarding characters and images that provide instruction and/or support for operations of the printer 2 to be performed by the user. The instruction information log includes icons, such as a display button, with which the user inputs information to be set for the printer 2. In steps SA1 to SA8, since the terminal device 1 does not receive the UI information D3 provided for the printer 2, the terminal device 1 executes a general-purpose user interface 6 capable of supporting a plurality of printers 2. After receiving the UI information D3 in step SA8, the terminal device 1 executes the user interface 6 based on the UI information D3.

In the example illustrated in FIG. 3, the terminal device 1 performs communication setting, which is one setting item among a plurality of setting items. The terminal device 1 requests the user to input, as one of the items of setting information, communication setting information about the second communication channel 52 of the printer 2 (step SA9). The communication setting information is information used for the terminal device 1 and the printer 2 to perform Wi-Fi communication via an access point, which is the second communication channel 52, and includes at least any one of a personal identification number (PIN), the service set identifier (SSID) of an access point to which the terminal device 1 and the printer 2 are connected, information specifying whether the access point supports AirStation One-Touch Secure System (AOSS) or Wi-Fi Protected Setup (WPS), and the like. Additionally, the communication setting information may include information specifying whether the printer 2 is to perform communication over a wireless LAN or to perform communication over a wired LAN using Ethernet cables. Ethernet and AOSS are registered trademarks.

After step SA12 and step SB4, the terminal device 1 and the printer 2 are connected by the second communication channel 52.

Then, the terminal device 1 displays information logs and the like about the setup of the main body of the printer 2 by means of the user interface 6 (step SA12). In step SA12, by means of the user interface 6, the terminal device 1 displays information about the setting operations for the main body of the printer 2 and about various operations for staring to use the printer 2. The setting operations and various operations include at least one of an operation of removing a protection tape attached to the printer 2, an operation of attaching an option unit, an attachment operation and an ink filling operation of an ink cartridge, an operation of loading paper sheets as a printing medium, an operation of installing the printer 2, and the like. In response to completion of providing information for initial setup of the printer 2, the terminal device 1 finishes the user interface 6 (step SA13).

The initial setup process of the printer 2 that the terminal device 1 performs by using the user interface 6 includes a plurality of setting steps mentioned above for the communication functions of the printer 2. The user interface 6 includes the content about initial setup of the printer 2 other than the setting steps for the communication functions. The communication setting of the printer, the initial setup for other functions, and the entirety of these initial setup steps correspond to the given process. This enables the terminal device 1 to present various types of information about the initial setup of the printer 2 to the user, in an understandable way, by using the user interface 6. As a result, the user may easily perform setting.

3. Display Example of User Interface 6

Figure 4:
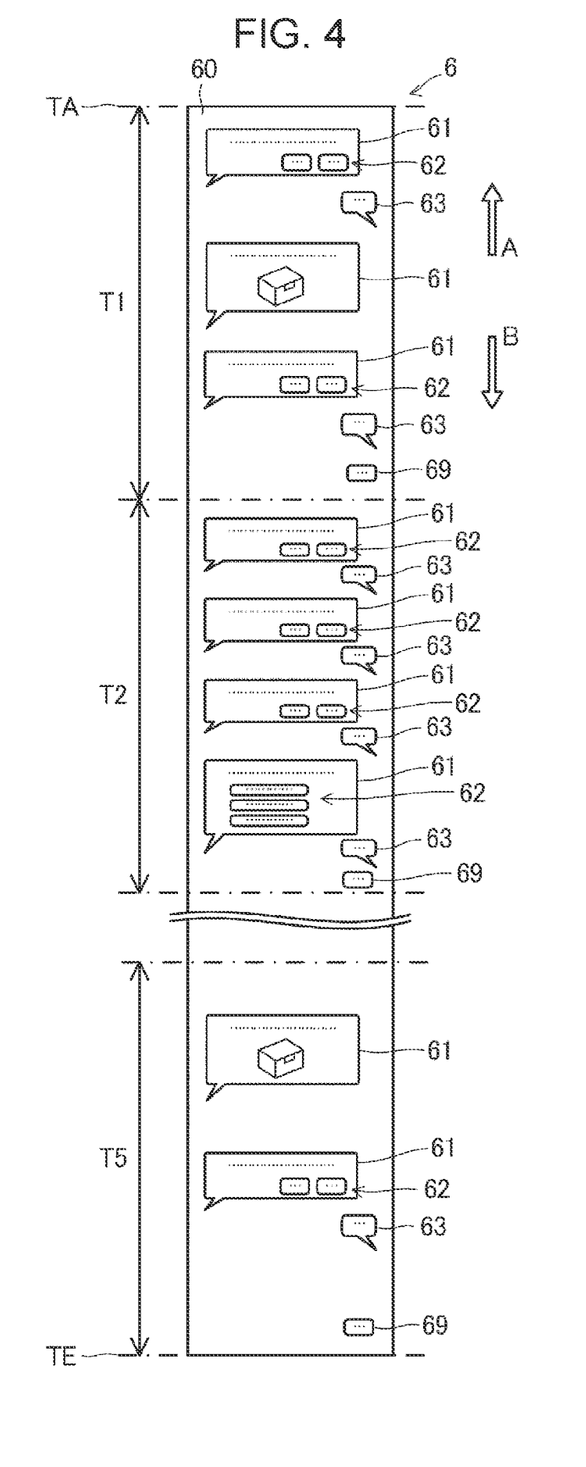
FIG. 4 is a diagram illustrating an example of a user interface of a terminal device.
Figure 5:
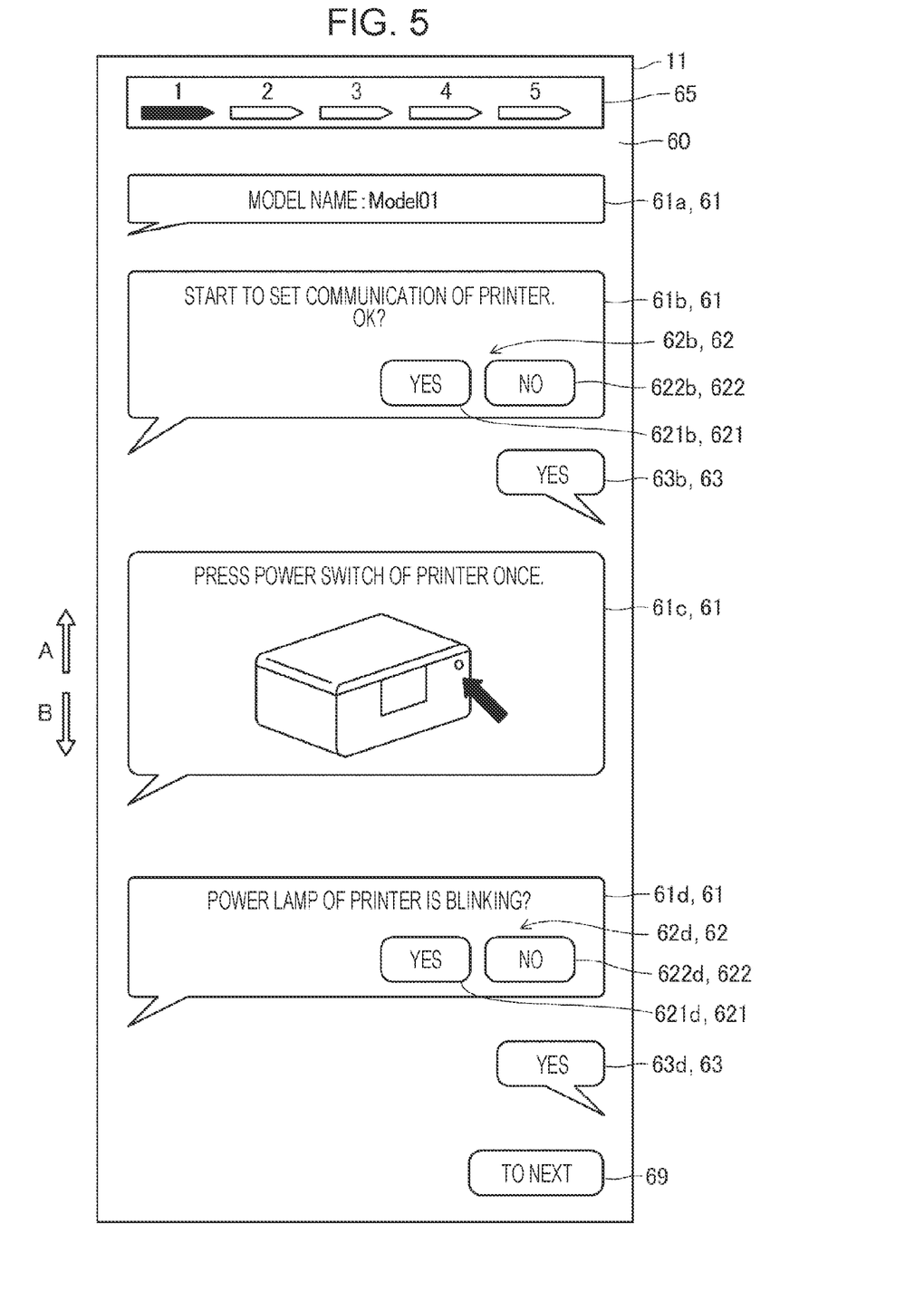
FIG. 5 is a diagram illustrating a display example of the terminal device.
Figure 6:
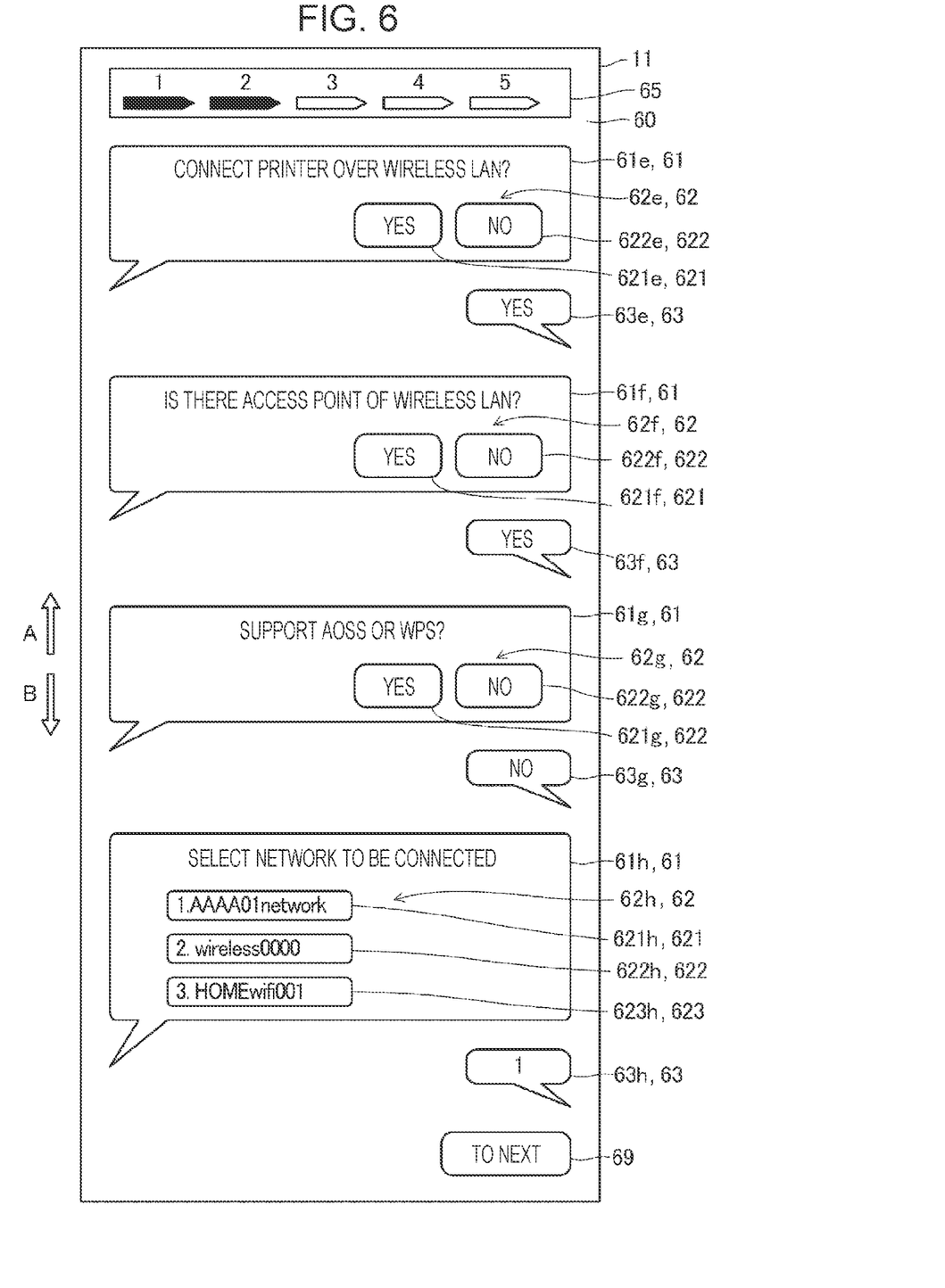
FIG. 6 is a diagram illustrating another display example of the terminal device.

FIG. 4, FIG. 5, and FIG. 6 illustrate specific examples of the user interface 6 provided by the terminal device 1.

FIG. 4, FIG. 5, and FIG. 6 illustrate display examples of the user interface 6 provided by the terminal device 1.

FIG. 4 illustrates an example of the user interface 6 that the terminal device 1 displays on the touch panel 11. The configuration illustrated in FIG. 4 is part of the user interface 6 described with reference to FIG. 3.

The user interface 6 includes a UI background section 60 and pluralities of device logs 61 and user logs 63 arranged in the UI background section 60. The device log 61 includes an information log and an instruction information log. The user log 63 corresponds to a response log. The UI background section 60 is a virtual area that is not limited by the size of the display area of the touch panel 11. The UI background section 60 is larger than the touch panel 11 in an A direction and a B direction corresponding to the vertical direction of the touch panel 11. In FIG. 4, the beginning of the image of the user interface 6 is denoted by TA and the end of the image of the user interface 6 is denoted by TE.

The device log 61 and the user log 63 are display objects displayed in the UI background section 60 and includes characters and images. The device log 61 and the user log 63 may translate into a message and a comment. The device log 61 and the user log 63 are arranged in a row in a direction that the user interface 6 is scrolled. The device log 61 corresponds to an instruction about initial setup.

The device log 61 is a message from the terminal device 1 to the user and includes information presented to the user. The device log 61 includes characters and/or images. The user log 63 is a message based on the content input by the user, and is displayed in response to an input operation of the user to the terminal device 1. The device log 61 includes information regarding the initial setup of the printer 2. The device log 61 includes information about initial setup of the printer 2 and information specifying an operation. The device log 61, including an instruction for user input, corresponds to an example of the instruction information log regarding instruction information. The user log 63 corresponds to an example of a user response.

At least some of the device logs 61 include the input request images 62. The input request image 62 is an image that requests the user to provide a response, and includes options 621 and 622 that are selectable by the user. In this case, the user may perform input by selecting one of the options 621 and 622 through tapping. The content of an operation performed by the user for the input request image 62 is displayed as a response of the user in the user log 63.

Since the user interface 6 is a chart-style interface, the device log 61 and the user log 63 are displayed in an arrangement resembling a conversation. The device log 61 is displayed at a position offset to the left in the UI background section 60, and the user log 63 is displayed at a position offset to the right in the UI background section 60. The left direction is one of the directions perpendicular to the scroll direction of a display image on the user interface 6, and the right direction is the other of the directions perpendicular to the scroll direction of the display image in the user interface 6. Thereby, the user interface 6 presents a conversation between the terminal device 1 and the user.

The user interface 6 includes the UI background section 60 that is larger than an area displayable on the touch panel 11. FIG. 4 illustrates the user interface 6 such that an area that is simultaneously displayable on the touch panel 11 is divided segments T1, T2, . . . , T5. Each of the segments T1, T2, . . . , T5 has a size of one screen of the touch panel 11.

The terminal device 1 scrolls the user interface 6 in the A direction and in the B direction, which is opposite to the A direction, in response to operations of the user. From a state where the segment T2 is displayed on the touch panel 11, the terminal device 1 allows the display to be scrolled up to the segment T1 or to the segment T5 by the operation of the user. Examples of the operation of the user in this case, that is, a scrolling include an operation of swiping a finger of the user in the B direction. In scrolling the display, the terminal device 1 may switch an area displayed on the touch panel 11 in the units of the segments T1, T2, . . . , T5, or may display any portion of the UI background section 60 on the touch panel 11, regardless of boundaries between the segments T1, T2, . . . , T5.

At an end of the segment T1, the operation image 69 is arranged. The operation image 69 is a display object operated by the user when the display on the touch panel 11 is moved from the segment T1 to the next area. When the operation image 69 is operated during display of the segment T1, the terminal device 1 moves the display from the segment T1 to the next segment T2.

When the operation image 69 is operated, the terminal device 1 may switch the display in units of the segments T1 to T5 or may switch the display at a position different from the boundaries between the segments.

The operation image 69 may also be arranged similarly at an end of each segment other than the segment T1.

FIG. 5 is a diagram illustrating a display example of the terminal device 1, illustrating an example in which the segment T1 of the user interface 6 is displayed on the touch panel 11.

At the time of starting display of the user interface 6, the device log 61 and the user log 63 are not displayed in the UI background section 60. After a certain period of time from the start of display, the terminal device 1 displays an ath log 61*a*, which is one device log. Subsequently, the terminal device 1 displays a bth device log 61*b*. The bth device log 61*b* includes a bth input request image 62*b*. The bth input request image 62*b* includes bth options 621*b* and 622*b*. The user performs an operation of selecting either the bth option 621*b* or the bth option 622*b*, thereby inputting a response regarding whether the setting of the printer 2 may be initiated or not. In accordance with an operation for the bth option 621*b* or 622*b*, the terminal device 1 displays a bth user log 63*b* corresponding to the bth device log 61*b*.

The input request image 62 may have a configuration without the options 621 and 622. The configuration in which the user may selectively input either the bth option 621*b* or the bth option 622*b* arranged in the bth input request image 62*b* is exemplary, and the input request image 62 may have an input area for entering characters.

In response to a response of the user to the bth input request image 62*b*, the terminal device 1 displays a cth device log 61*c*. The cth device log 61*c* includes characters and images for providing, to the user, an explanation for an operation performed by the user for the printer 2.

When receiving scrolling of the user after displaying the cth device log 61*c*, the terminal device 1 displays the dth device log 61*d*. The dth device log 61*d* includes a dth input request image 62*d*, which includes dth options 621*d* and 622*d*.

When detecting tapping at the display position of either the dth option 621*d* or the dth option 622*d*, the terminal device 1 receives the tapped option 621*d* as a response input of the user. The terminal device 1 displays a dth user log 63*d* in accordance with the response of the user. When the option 621*d* is tapped, the dth user log 63*d* indicating the answer "Yes" is displayed.

FIG. 6 is a diagram illustrating a display example of the terminal device 1, illustrating an example in which the segment T2 of the user interface 6 is displayed on the touch panel 11.

In the segment T2, subsequently to the content of the segment T1, an eth device log 61*e*, an fth device log 61*f*, a gth device log 61*g*, and an hth device log 61*h* for performing communication setting of the printer 2 are displayed.

The eth device log 61*e* is a message asking whether to connect the printer 2 to the terminal device 1 over a wireless LAN, and includes an eth input request image 62*e*. When either the option 621*e* or the option 622*e* in the eth input request image 62*e* is selected by the user, the terminal device 1 displays an eth user log 63*e*.

In response to each of the user selection of the eth option 621*e* and the user selection of the eth option 622*e*, the terminal device 1 displays the fth device log 61*f*. In FIG. 6, the user selects the first option 621*e* of the eth options 621*e* and 622*e*, and thus the fth device log 61*f* with content corresponding to the case of connecting the printer 2 over the wireless LAN is displayed. If the user selects the second option 622*e* of the eth options 621*e* and 622*e*, the terminal device 1 displays the fth device log 61*f* (not illustrated) with content corresponding to the case of connecting the printer 2 over the wired LAN.

The content that the terminal device 1 displays in the device log 61 is included in the UI display information 19*b* stored in the terminal storage section 19. The UI display information 19*b* includes, as content displayed in the eth device log 61*e*, characters and images of eth device log 61*e* and the eth input request image 62*e*. The UI display information 19*b* includes content of the fth device log 61*f* displayed when the first option 621*e* of the eth options 621*e* and 622*e* is selected for the eth device log 61*e*, and content of the fth device log 61*f* displayed when the second option 622*e* of the eth options 621*e* and 622*e*. In response to acquiring a response to the eth input request image 62*e*, the terminal device 1 acquires the content of the fth device log 61*f*, which is provided for the acquired response, from the UI display information 19*b* and displays the fth device log 61*f*.

The user interface 6 does not have a fixed configuration of the device logs 61 and the input request images 62, but the content of the user interface 6 varies depending on a response of the user.

The fth device log 61*f* has content of asking whether there is an access point of a wireless LAN to which printer 2 may be connected, and includes an fth input request image 62*f*. The fth input request image 62*f* includes fth options 621*f* and 622*f*. When the user selects either the option 621*f* or the option 622*f*, the terminal device 1 displays an fth user log 63*f* in accordance with the option. The terminal device 1 displays the gth device log 61*g* in response to a respond to the fth input request image 62*f*.

On the assumption that the printer 2 is connected to an access point of the wireless LAN, the gth device log 61g has content of asking whether the use of AOSS or WPS is possible, and includes a gth input request image 62g. The gth input request image 62g includes gth options 621g and 622g. When the user selects either the gth option 621g or the gth option 622g, the terminal device 1 displays a gth user log 63g in accordance with the selection. The terminal device 1 displays the hth device log 61h in response to a respond to the gth input request image 62g.

The hth device log 61h includes an hth input request image 62h including three hth options 621h, 622h, and 623h. The terminal device 1 searches for a Wi-Fi segment to which the printer 2 may be connected, and generates and displays the hth options 621h, 622h, and 623h in accordance with a search result. The terminal device 1 may perform processing, such as Wi-Fi search processing, using not only the content stored in advance as the UI display information 19b but also a response of the user to the gth input request image 62g and generate the hth device log 61h. When the user selects any of the options 621h, 622h, and 623h, the terminal device 1 displays an hth user log 63h in accordance with the selection.

As illustrated in FIG. 5 and FIG. 6, in displaying the user interface 6 on the touch panel 11, the terminal device 1 displays a progress display 65. The progress display 65 is an image illustrating the progress of the initial setup process of the printer 2 using the user interface 6 at that time relative to the entirety of the initial setup process.

The progress display 65 illustrated in FIG. 5 indicates the progress of the content of the segment T1 relative to the entirety of the initial setup process using the user interface 6. The terminal device 1 calculates the progress using, as references, the number of device logs 61 included in the user interface 6 and the image length in the scroll direction of the user interface 6.

Assuming that the number of device logs 61 that has already been displayed on the touch panel 11 is nd, relative to the total number na of the device logs 61 included from the beginning TA of the user interface 6 to the end TE illustrated in FIG. 4, the terminal device 1 calculates a progress rate R1 by the following equation:

$$\text{Progress rate } R1(\%) = (nd/na) \times 100 \quad (1)$$

Here, nd may be the number of device logs 61 displayed on the touch panel 11 or may be the number of device logs 61 included in the segment displayed on the touch panel 11 including the device logs 61 that are not displayed.

The terminal device 1 displays, in the progress display 65, the numerical value of the progress rate R1, the value in percentage of the progress rate R1, an image indicating the progress rate R1, and the like. The progress display 65 illustrated in FIG. 5 and FIG. 6 is an image of displaying the progress rate R1 step by step.

The terminal device 1 may display, in the progress display 65, the number of setting steps for which setting is complete, relative to the number of setting steps included in the initial setup process using the user interface 6. Assuming that the total number of setting steps or setting items that are set in the initial setup process is nsa and that the number of setting steps or setting items that have been set in steps SA12 and SB4 is nsd, a progress rate R2 is calculated by the following equation:

$$\text{Progress rate } R2(\%) = (nsd/nsa) \times 100 \quad (2)$$

The progress rate R2 may be displayed in the progress display 65, like the progress rate R1. The terminal device 1 displays the numerical value of the progress rate R2, a value, in percentage, of the progress rate R2, an image indicating the progress rate R2, and so on in the progress display 65. As in the progress display 65 illustrated in FIG. 5 and FIG. 6, the progress rate R2 may be displayed as a step-by-step image.

As described above, the length of the user interface 6 and the total number of device logs 61 included in the user interface 6 may vary depending on a response of the user for the input request image 62. In this case, the terminal device 1 may again calculate the progress rate R1 or the progress rate R2 after the variation and update the progress display 65. The progress display 65 is displayed at any time in any segment among the segments T1, T2, T3, T4, and T5 in FIG. 4.

4. Display of User Interface 6

Figure 7:
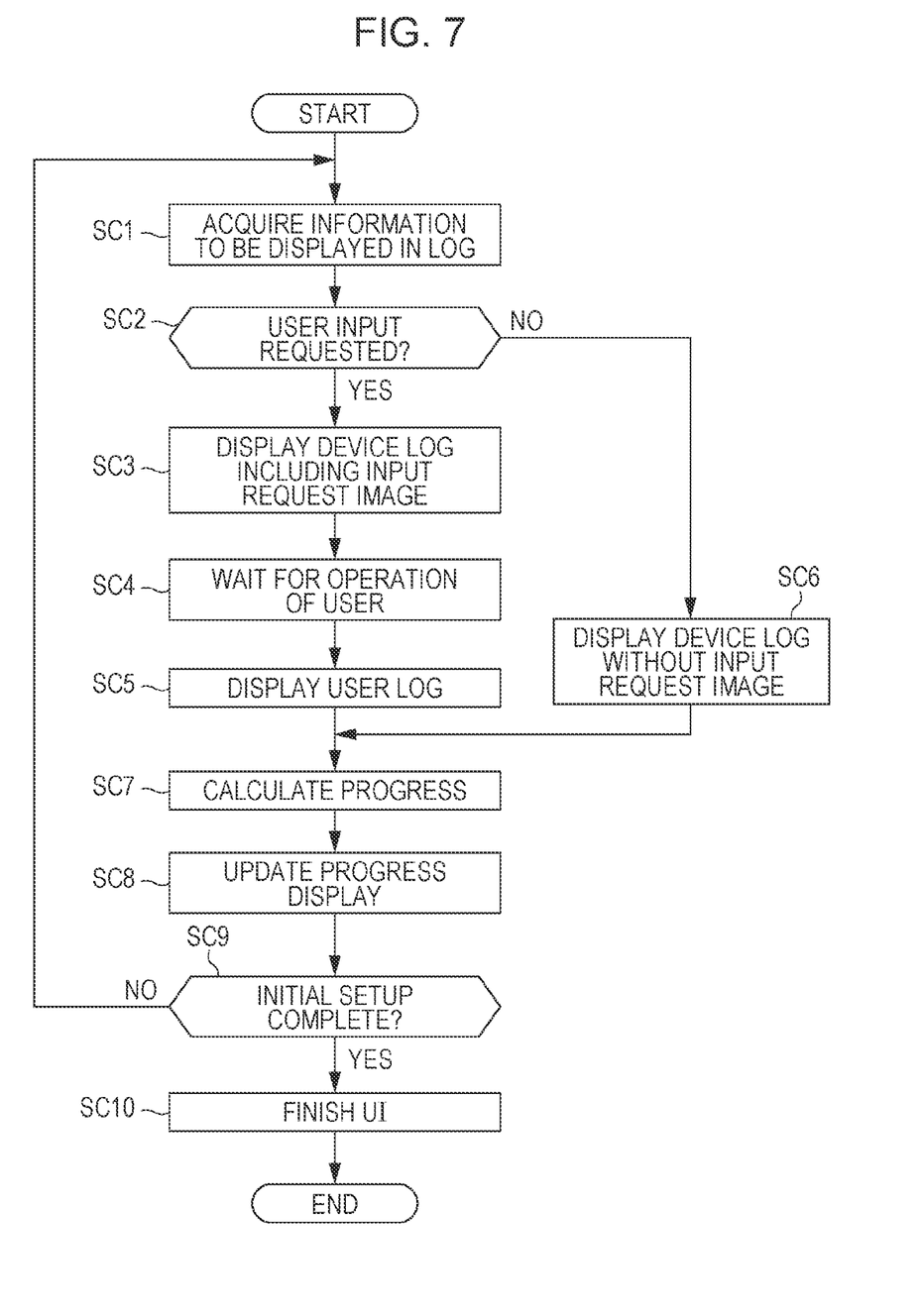
FIG. 7 is a flowchart illustrating operations of the terminal device.

FIG. 7 is a flowchart illustrating operations of the terminal device 1, illustrating operations about displays of the device logs 61 and the user logs 63 in the initial setup user interface 6. The operations illustrated in FIG. 7 are executed by the display controller 17 and the process execution section 18.

The terminal device 1 acquires information about the device log 61 in the initial setup user interface 6 (step SC1) and determines whether the device log 61 requests user input (step SC2). If the user input is requested for the device log 61 about which information is acquired in step SC1 (Yes in step SC2), the terminal device 1 displays the device log 61 including the input request image 62 (step SC3).

The terminal device 1 waits for an input operation of the user using the input request image 62 (step SC4). When the operation of the user using the input request image 62 is performed, the terminal device 1 displays the user log 63 in accordance with the operation of the user (step SC5) and proceeds to step SC7.

Alternatively, if the user input is not requested for the device log 61 about which information is acquired in step SC1 (No in step SC2), the terminal device 1 displays the device log 61 that does not include the input request image 62 (step SC6) and proceeds to step SC7.

In step SC7, the terminal device 1 calculates the progress of the user interface 6 (step SC7). In step SC7, the terminal device 1 calculates the progress rate R1 using equation (1) mentioned above with the number of displayed device logs 61, including the device logs 61 displayed in steps SC3 and SC6, and the total number of device logs 61 included in the user interface 6. The terminal device 1 may include the user logs 63 for the calculation of the progress rate R1.

The terminal device 1 updates the progress display 65 in accordance with the calculated progress (step S8) and proceeds to step SC9.

In step SC9, the terminal device 1 determines whether setting with the user interface 6 is complete (step SC9). For example, if the user interface 6 is displayed completely and the initial setup of the printer 2 is completed, the terminal device 1 determines affirmatively that the setting is complete (Yes in step SC9). In this case, the terminal device 1 finishes the user interfaces 6 (step SC10).

If the initial setup of the printer 2 using the user interface 6 is not completed (No in step SC9), the terminal device 1 returns to step SC1 where the terminal device 1 displays the next device log 61.

During the operations illustrated in FIG. 7, the terminal device 1 may receive an operation of instructing the terminal device 1 to perform scrolling. When the terminal device 1 receives swiping, the terminal device 1 scrolls the user interface 6 displayed on the touch panel 11 either in the A direction or in the B direction.

5. Advantageous Effects of Embodiment

As described above, the screen display method according to the embodiment is a screen display method for providing display, on the touch panel 11 included in the terminal device 1, for a given process to be performed for the printer 2. The screen display method includes displaying, in a chat style, a plurality of instructions regarding the given process and a response to the plurality of instructions, and providing progress display 65 indicating a progress of the given process.

The program 19*a* according to the embodiment is a program executed by the terminal device 1 that includes the touch panel 11 and provides display for a given process to be performed for the printer 2. The program 19*a* causes a plurality of instructions regarding the given process and a response to the plurality of instructions to be displayed in a chat style on the touch panel 11, and causes the progress display 65 indicating a progress of the given process to be displayed on the touch panel 11.

The terminal device 1 according to the embodiment includes the display section 15, which provides display, and the display controller 17, which causes the display section 15 to display an image of the user interface 6 that displays, in a chat style, a plurality of instructions regarding the given process to be performed for the printer 2 and a response to the plurality of instructions, and to provide progress display indicating a progress of the given process. The terminal device 1 includes the input section 14, which receives input of the response to the instruction, and the process execution section 18, which executes the given process in accordance with a response received by the input section 14.

According to the terminal device 1, the screen display method for the terminal device 1, and the program 19*a*, when information about a process to be performed for the printer 2 is displayed in a chat style, the progress of the process is presented. When instructions for a process, such as initial setup of the printer 2, and information presentations are displayed in a chat style, the image of the user interface 6 tends to be long in the scroll direction and thus the user is unlikely to grasp the progress. Therefore, the user may easily know the progress when the user performs the process for the printer 2 while viewing the display on the touch panel 11.

In the above description, the given process is a process for communication setting between the terminal device 1 and the printer 2. In performing the process for communication setting between the terminal device 1 and the printer 2, the terminal device 1 may inform the user of the progress.

The terminal device 1 displays an image indicating a process to be performed for the printer 2 by the user, in a chat style, on the touch panel 11. In this case, the terminal device 1 may display the progress for operations performed by the user to inform the user.

In the above description, the given process may be a process of performing setting for the printing functions of the printer 2. The given process may be preparations for the printing functions of the printer 2, such as replenishing ink to the printer 2.

The progress display 65 indicates the progress rate of the content displayed on the touch panel 11 relative to the entirety of the given process. In this case, by means of the progress display 65, the terminal device 1 may inform the user of the progress relative to the entirety of the process to be performed with the user interface 6.

The given process is the initial setup process of the printer 2 and includes a plurality of setting steps for a function of the printer 2. When performing a plurality of setting steps for the printer 2, the terminal device 1 may inform the user of the progress.

The progress display 65 indicates the number of the setting steps for which setting is complete, relative to the number of the plurality of setting steps included in the initial setup process. By means of the progress display 65, the terminal device 1 may inform the user of the progress relative to the entirety of the setting steps to be performed for the printer 2.

The terminal device 1 includes the terminal storage section 19, and the terminal storage section 19 stores the UI display information 19*b* including a plurality of instructions regarding the given process. By using the UI display information 19*b*, the terminal device 1 may quickly display the logs 61.

The display controller 17 selects, among the instructions stored in the terminal storage section 19, an instruction provided for the response received by the input section 14, and causes the display section 15 to display the selected instruction. The terminal device 1 appropriately responds the response of the user to provide an instruction to the user by using the user interface 6.

6. Other Embodiments

The present disclosure is not limited to the embodiment described above and may be carried out in various manners without departing from the spirit and scope thereof.

In the above description, when the terminal device 1 transmits the printer information D1 indicating the model and the like of the printer 2 to the server 3 once, the server 3 transmits the UI information D3 provided for the printer 2 to the terminal device 1 once. This is merely exemplary. The UI information D3 may be transmitted a plurality of different times from the server 3 to the terminal device 1. In accordance with the display progress of the user interface 6, the terminal device 1 transmits the printer information D1 to the server 3 once or a plurality of times. The terminal device 1 may include data about the progress of the user interface 6 in the printer information D1. The server 3 may receive the printer information D1 from the terminal device 1, generate new UI information D3 in accordance with the advancement of the process, and transmit the new UI information D3 to the terminal device 1.

Upon each receipt of the UI information D3, the process execution section 18 may generate or update the UI display information 19*b*.

In the embodiment described above, examples of the operations performed for the terminal device 1 by the user include tapping and swiping. In the embodiment described above, an example in which swiping of the user provides an instruction for scrolling is illustrated. However, the operations are not limited to this, and the input section 14 may detect pinching in which the user touches the touch panel 11 at a plurality of operating positions, a gesture of moving the contact position on the touch panel 11 in a predetermined manner, an operation of moving the terminal device 1, and so on. The input section 14 may also receive a sound operation.

The setting of the printer 2 performed by the terminal device 1 by using the user interface 6 is, as described above, not limited to communication setting of the printer 2 and the setting of printing functions of the printer 2. The setting may be a process of setting the name of the printer 2, setting of an electronic mail address for the case where the printer 2 sends and receives data via electronic mail, setting optional parts attached to the printer 2, and so on.

The user interface 6 illustrated in FIGS. 4 to 6 are exemplary and may include the UI background section 60 that is larger in lateral size than the touch panel 11. The UI background section 60 may not be in a fixed state, and the UI background section 60 may change in accordance with the display style of the user interface 6. The UI background sections 60 displayed on the touch panel 11 may include different images in the segment T1 and in the segment T2.

At least some of the functional blocks illustrated in FIG. 2 may be implemented by hardware or may be implemented by hardware and software cooperating with each other. The program 19a may be stored in an external storage device coupled to the terminal device 1.

The processing units in the sequence diagram in FIG. 3 and in the flowchart in FIG. 7 are units into which the operations of the components of the printing system 100 are divided in accordance with the main processing content for ease of understanding. The embodiments are not limited by how to divide the processing units and the names, and the operations of the components of the printing system 100 may be divided into a larger number of processing units and may also be divided such that one processing unit includes a larger number of processing units. The processing orders illustrated in FIG. 3 and FIG. 7 are exemplary, and the order of some of the process operations may be rearranged.

What is claimed is:

1. A screen display method for providing, on a display screen included in a terminal device, display for a given process to be performed for an image processing apparatus, the screen display method comprising:
displaying, in a chat style, a plurality of instructions regarding the given process and a plurality of responses to the instructions, and
providing progress display indicating a progress of the given process,
wherein the plurality of instructions and the plurality of responses are divided into a plurality of segments, with only one segment of the plurality of segments being displayed on the display screen in the chat style, and
wherein a user interface image is included in the chat style that is used to cause the display to change from displaying the segment being displayed to displaying another of the plurality of segments.

2. The screen display method according to claim 1, wherein the given process is a process for communication setting between the terminal device and the image processing apparatus.

3. The screen display method according to claim 1, further comprising displaying, on the display screen, an image indicating a process to be performed for the image processing apparatus by the user, in a device log in the chat style.

4. The screen display method according to claim 1, wherein the progress display indicates a progress rate of the given process displayed on the display screen relative to entirety of the given process.

5. The screen display method according to claim 1, wherein the given process is an initial setup process of the image processing apparatus and includes a plurality of setting steps for a function of the image processing apparatus.

6. The screen display method according to claim 5, wherein the progress display indicates a number of the setting steps for which setting is complete, relative to a number of the plurality of setting steps included in the initial setup process.

7. A non-transitory computer-readable storage medium storing a program that, when executed by a processor of a terminal device that includes a display screen and provides display for a given process to be performed for an image processing apparatus, causes the processor to perform a method, the method comprising:
on the display screen, displaying, in a chat style, a plurality of instructions regarding the given process and a plurality of responses to the instructions, and
providing, on the display screen, progress display indicating a progress of the given process,
wherein the plurality of instructions and the plurality of responses are divided into a plurality of segments, with only one segment of the plurality of segments being displayed on the display screen in the chat style, and
wherein a user interface image is included in the chat style that is used to cause the display to change from displaying the segment being displayed to displaying another of the plurality of segments.

8. The non-transitory computer-readable storage medium according to claim 7, wherein the given process is a process for communication setting between the terminal device and the image processing apparatus.

9. The non-transitory computer-readable storage medium according to claim 7, the method further comprising displaying, on the display screen, an image indicating a process to be performed for the image processing apparatus by the user, in a device log in the chat style.

10. The non-transitory computer-readable storage medium according to claim 7, wherein the progress display indicates a progress rate of the given process displayed on the display screen relative to entirety of the given process.

11. The non-transitory computer-readable storage medium according to claim 7, wherein the given process is an initial setup process of the image processing apparatus and includes a plurality of setting steps for a function of the image processing apparatus.

12. The non-transitory computer-readable storage medium according to claim 11, wherein the progress display indicates a number of the setting steps for which setting is complete, relative to a number of the setting steps included in the initial setup process.

13. A terminal device that provides display for a given process to be performed for an image processing apparatus, the terminal device comprising:
a display section configured to provide display;
a display controller configured to cause the display section to
display a user interface image that displays, in a chat style, a plurality of instructions or requests to a user regarding the given process to be performed for the image processing apparatus and a plurality of responses to the instructions, and
to provide progress display indicating a progress of the given process an input section configured to receive input of the responses to the requests; and
a process execution section configured to cause the given process to be executed for the image processing apparatus,
wherein the plurality of instructions and the plurality of responses are divided into a plurality of segments, with only one segment of the plurality of segments being displayed on the display screen in the chat style, and wherein a user interface image is included in the chat style that is used to cause the display to change from displaying the segment being displayed to displaying another of the plurality of segments.

14. The terminal device according to claim 13, further comprising a storage section configured to store the plurality of instructions or requests regarding the given process.

15. The terminal device according to claim 14, wherein the display controller is configured to select one instruction provided for the response received by the input section among the plurality of instructions, and to cause the display section to display the one instruction.

16. The terminal device according to claim 13, wherein the given process is a process for communication setting between the terminal device and the image processing apparatus.

17. The terminal device according to claim 13, wherein the display controller is further configured to cause the display section to display an image indicating a process to be performed for the image processing apparatus by the user, in a device log in the chat style.

18. The terminal device according to claim 13, wherein the progress display indicates a progress rate of the given process displayed by the display section relative to the entire given process.

19. The terminal device according to claim 13, wherein the given process is an initial setup process of the image processing apparatus and includes a plurality of setting steps for a function of the image processing apparatus.

20. The terminal device according to claim 13, wherein the progress display indicates a number of the setting steps for which setting is complete, relative to a number of the plurality of setting steps included in the initial setup process.

* * * * *